United States Patent
Skinner

[11] 3,819,055
[45] June 25, 1974

[54] FILTER CUP CONSTRUCTION
[75] Inventor: James R. Skinner, Cupertino, Calif.
[73] Assignee: M. U. Engineering & Mfg., Inc., Mountain View, Calif.
[22] Filed: Sept. 20, 1973
[21] Appl. No.: 398,958

[52] U.S. Cl................ 210/232, 210/455, 210/476, 210/477, 210/489, 210/492, 210/495
[51] Int. Cl............................................. B01d 27/04
[58] Field of Search............ 210/DIG. 23, 232, 455, 210/476, 477, 488, 489, 492, 495, 497

[56] References Cited
UNITED STATES PATENTS
| | | | |
|---|---|---|---|
| 2,696,818 | 12/1954 | Loghem | 210/DIG. 23 |
| 3,608,736 | 9/1971 | Wong | 210/477 |
| 3,709,365 | 1/1973 | Czaplinski et al. | 210/455 |
| 3,763,879 | 10/1973 | Jaworek | 210/232 |

*Primary Examiner*—Charles N. Hart
*Assistant Examiner*—F. F. Calvetti
*Attorney, Agent, or Firm*—Flehr, Hohbach, Test, Albritton & Herbert

[57] ABSTRACT

Filter cup construction having a cup-like member, the cup-like member having a stem-like cup portion and a funnel-like portion adjoining the stem-like cup portion. The funnel-like portion is adapted to receive a filter member. The filter retaining member is frictionally retained within the funnel-like member and engages the filter member so that a liquid such as blood can be introduced into the funnel-like member and filtered through the filter member and retained within the stem-like cup portion.

7 Claims, 8 Drawing Figures

FILTER CUP CONSTRUCTION

BACKGROUND OF THE INVENTION

Heretofore, cups have been provided for receiving samples of blood with the cups being of a type which can be disposed in receptacles provided in the outer rim of a circular turntable or wheel. There, however, is a need for a cup of this type by which a filtering operation can be carried out.

SUMMARY OF THE INVENTION AND OBJECTS

The filter cup construction comprises a cup-like member which is adapted to receive a filter member. A filter retaining member frictionally disposed within the cup-like member engages the filter member. The cup-like member has a stem-like cup portion and a funnel-like portion adjoining the stem-like portion. The funnel-like portion is open at the top and has an upwardly extending side wall and a bottom wall having an opening therein. The bottom wall is inclined downwardly toward the opening in the bottom wall. The stem-like cup portion is open at the top and adjoins the bottom wall opening so that the opening in the bottom wall is in registration with the open end of the stem-like cup portion. The stem-like cup portion has a cup-like cavity for receiving liquid entering through said opening. The filter retaining member is of a ribbed construction and is provided with an upwardly extending side wall adapted to frictionally engage the side wall of the funnel-like member and which is adapted to engage the filter member to retain the same within the funnel-like portion and to form a seal with respect thereto so that liquid entering the funnel-like portion must pass through the filter member before it can enter into the cup-like cavity of the stem-like cup portion.

In general, it is an object of the present invention to provide a filter cup construction of the type in which filtering can be accomplished within the filter cup and a sample taken without disassembly of the filter cup.

Another object of the invention is to provide a construction of the above character which can be utilized in conjunction with a turntable or wheel having cup receiving slots provided near the outer rim of the same.

Another object of the invention is to provide a construction of the above character in which the filter members can be readily inserted.

Another object of the invention is to provide a construction of the above character which is of the disposable type.

Additional objects and features of the invention will appear from the following description in which the preferred embodiments are set forth in detail in conjunction with the accompanying drawings.

DESCRIPTION OF PREFERRED EMBODIMENTS

Figure 1:
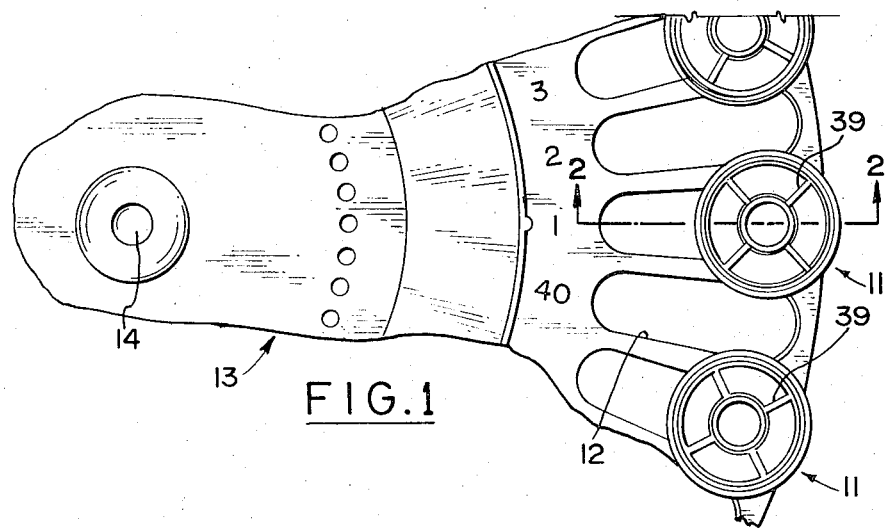
FIG. 1 is a top plan view showing a portion of a turntable or wheel having a plurality of the cup-like constructions incorporating the present invention mounted therein.
Figure 3:
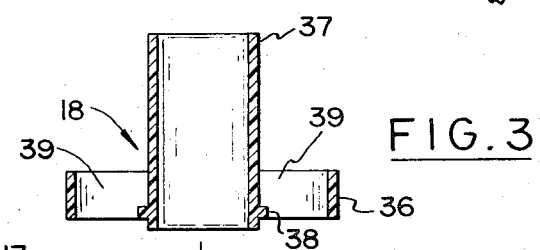
FIG. 3 is a cross-sectional view of a filter retaining member utilized in the cup construction shown in FIG. 2.

Filter cup constructions 11 incorporating the present invention are shown in FIG. 1 mounted in a plurality of elongate holes or slots 12 spaced circumferentially adjacent the outer rim of a turntable or wheel 13, the center of which is indicated at 14. The turntable or wheel 13 is of a conventional construction and, therefore, will not be described in detail. However, as can be seen in FIG. 1, the elongate holes or slots are slightly narrower at the innermost extremities remote from the outer rim of the wheel. Both the innermost and outermost extremities of the slots are arcuate as shown in FIG. 1. By way of example, such a wheel could contain 40 such slots which are numbered in the manner indicated.

The filter cup construction 11 consists of a cup-like member 16 which is adapted to receive a filter member 17. The filter member is retained within the cup-like member by a coaxially mounted filter retaining member 18.

Figure 2:
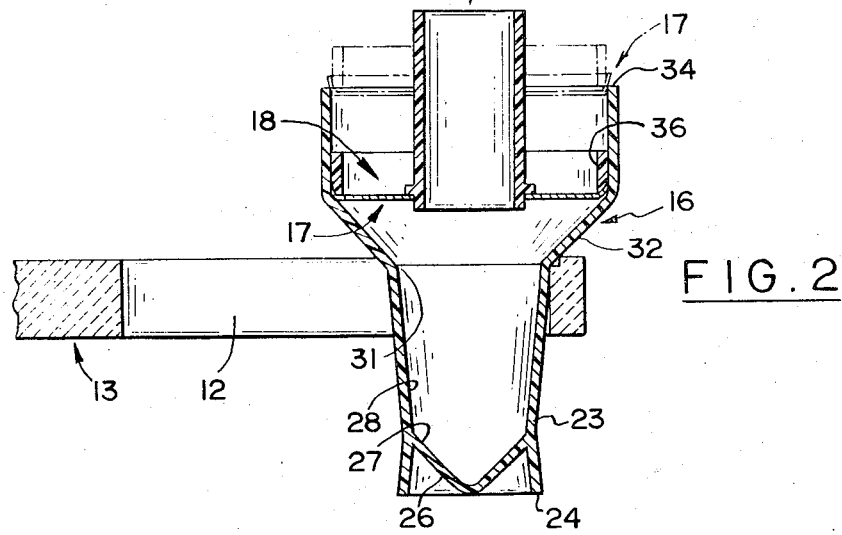
FIG. 2 is a cross-sectional view taken along the line 2—2 of FIG. 1.

The cup-like member 16 is a unitary member and is formed of a suitable material such as plastic and preferably a plastic which is relatively transparent. The cup-like member 16 consists of a stem-like cup portion 21 and a funnel-like portion 22 which adjoins the stem-like cup portion 21. The stem-like cup portion 21 is provided with a generally vertical wall 23 which is inclined slightly outwardly in an upward direction as shown in FIG. 2. In horizontal cross-section, the wall 23 is in the form of a circle. The lower extremity of the wall 23 is planar and serves as a stand-up rim 24 for the filter cup.

The lower extremity of the funnel-like portion is provided with a conical end closure 26 which is formed integral with the wall 23 and has its lower extremity generally flush with the rim 24. The conical end closure 26 is provided with a cone-shaped recess 27 which opens upwardly into the cup-shaped cavity 28 provided within the stem-like cup portion 21. The cup-shaped cavity 28 opens upwardly into an opening 31 provided in the bottom wall 32 of the funnel-like portion 22. As can be seen, the bottom wall 32 is inclined downwardly toward the opening 32. The funnel-like portion 22 is also provided with an upwardly extending side wall 33 which adjoins the bottom wall 32. The side wall 33 is planar at its upper end and forms a rim 34. In horizontal cross-section, the vertical side wall 33 is circular as can be seen from FIG. 1 and has a diameter which is substantially greater than the diameter of the side wall 23 of the stem-like cup portion 21.

The filter retaining member 18 consists of an upwardly extending wall 36 which in cross-section is also circular and which is of such a size so that it can fit within the upwardly extending side wall 33 of the funnel-like portion 22 and to frictionally engage the same with a relatively loose fit for a purpose hereinafter described. Means is provided for permitting insertion and removal of the filter retaining member 18 from within the funnel-like portion 22 and consists of a hollow cylindrical stem or handle 37. The stem or handle 37 is provided with a radially extending flange 38 extending outwardly therefrom just slightly above the lower extremity of the stem or handle 37. Suitable means is provided for securing the stem or handle 37 to the side wall 36 and consists of a plurality of radially extending ribs 39 formed integral with the wall 36 and the stem or handle 37. The lower edges of the ribs 39 are flush with the lower extremity of the flange 38 for a purpose hereinafter described.

Figure 4:
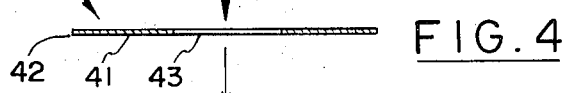
FIG. 4 is a cross-sectional view of the filter member utilized in the cup construction shown in FIG. 2.
Figure 5:
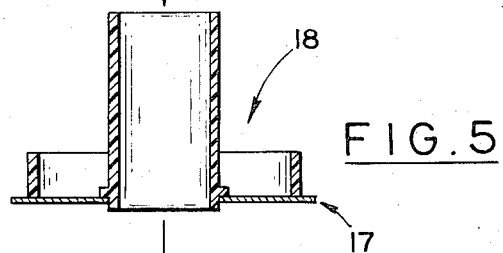
FIG. 5 is a cross-sectional view showing the filter retaining member and the filter mounted together for insertion into the cup-like member for assembly in the manner shown in FIG. 2.

The filter member 17 is shown in FIG. 4 and is formed of a suitable flexible sheet-like material such as that supplied by Millipore. It consists of a circular disc 41 which is cut from the filter material and which is provided with a circular outer edge 42 and a central hole 43. The hole 43 is of such a size so that the filter member 17 can be slipped over the lower extremity of the stem or handle 37 as shown in FIG. 5 so that the inner margin of the disc defining the hole 43 is in engagement with the lower extremity of the flange 38 and so that the intermediate portions thereof are in engagement with the lower extremities of the ribs 39 and the lower surface of the wall 36.

The filter retaining member 18 with the filter 17 secured thereto is grasped by one hand and the cup-like member 16 is grasped by the other hand and the filter member 17 and the filter retaining member 18 inserted into the funnel-like portion 22 as shown in FIG. 2. As this is occurring, the outer margin of the filter member 17 is bent upwardly around the outer side of the vertical side wall 33 of the filter retaining member 18 as shown in broken lines in FIG. 2. The filter retaining member 18 is then moved downwardly until it seats against the upper extremity of the bottom inclined wall 32. As shown in FIG. 2, it can be seen that the outer extremity of the filter member 17 is firmly gripped between the vertical side wall 36 of the filter retaining member 18 and the vertical side wall 33 of the cup-like member 16. The filter member is retained relatively taut against the lower extremities of the ribs 28 and in engagement with the flange 38 as shown in FIG. 2.

The filter cup construction is now ready for use and can be placed in the holes or slots 12 of the turntable or wheel 13. Because of the size of the funnel-like portions 22, the filter cups 11 can only be inserted in alternate holes. The filter cups are then ready for use. For example, blood to be analyzed can be introduced into each of the filter cups around the outer rim between the stem 37 and the funnel-like portion 22. The blood, after insertion into the funnel-like portion 22 before it can enter the cup-like cavity 28, must pass through the filter member 17. The sediment in the blood will be collected in the conical cavity 27.

After the blood has been filtered and collected within the cup-like member 16, a pick-up needle (not shown) enters the stem 37 and then the cavity 28 to suck up a sample and to thereafter retract. The wheel 13 is then indexed to the next position and the pick-up needle picks up another sample. This continues until all of the blood samples have been sampled.

The construction of the cup-like member 16 and the filter retaining member 18 is such that they can be readily cleaned and re-used. However, since both are constructed of plastic, they are relatively inexpensive and can be utilized once and disposed of if desired.

Figure 6:
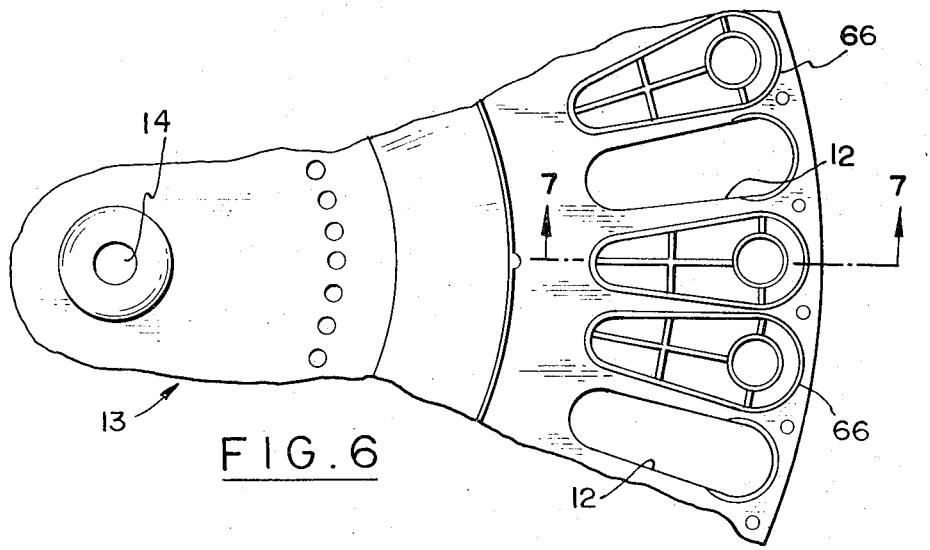
FIG. 6 is a top plan view of a portion of the same turntable wheel shown in FIG. 1 having another embodiment of the filter cup construction mounted therein.
Figure 8:
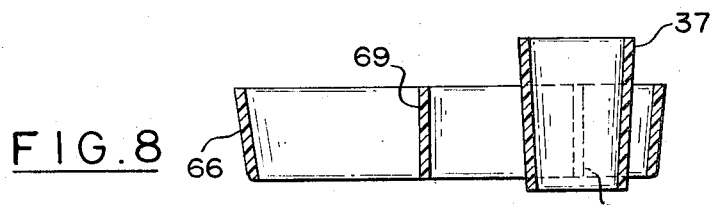
FIG. 8 is a cross-sectional view showing a filter retaining member which is utilized in the construction shown in FIG. 7.
Figure 7:
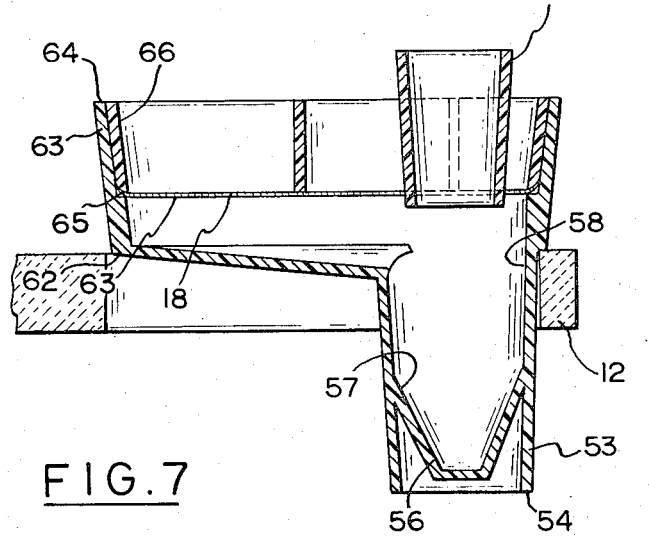
FIG. 7 is a cross-sectional view taken along the line 7—7 of FIG. 6.

Another embodiment of the filter cup construction is shown in FIGS. 6, 7 and 8. As can be seen therein, this filter cup construction is very similar to that hereinbefore described with the exception that it has a different configuration, i.e. one that is substantially identical to that of the slots 12 so that one of the filter cups can be provided in each of the slots 12.

Thus, there is provided a cup-like member 46, a filter member 47 and a filter retaining member 48. The cup-like member 46 is provided with a stem-like cup portion 51 and a funnel-like portion 52. The funnel-like portion is provided with a wall 53 which is inclined upwardly slightly from the vertical and which is provided with a planar lower surface which serves as a rim 54. The side wall 53 is circular in cross-section. A conical end closure 56 is provided and has a lower extremity which is only slightly above the rim 54. A conical recess 57 is provided within the enclosure 56 which opens upwardly into a cup-shaped recess 58. The cup-shaped recess 58 opens into an opening 61 in a bottom wall 62 of the funnel-like portion 52. As can be seen from FIGS. 6 and 7, the opening 61 is provided adjacent one end of the funnel-like portion 22 and the bottom wall 62 slopes downwardly toward the same. The bottom wall 62 is elongate and has generally the same configuration as the holes or slots 12 provided in the turntable or wheel 13. A side wall 63 is provided which is inclined outwardly as shown in FIG. 7 and adjoins the bottom wall 62. The upper surface of the vertical side wall 33 is planar to provide a rim 64 which is parallel to the rim 54. The inner surface of the wall 63 is provided with a shoulder 65 for a purpose hereinafter described.

The filter retaining member 48 consists of a side wall 36 which is also inclined upwardly at the same angle as the side wall 63 of the funnel-like portion 52. A stem or handle 67 is provided which also has a wall which is inclined away from the vertical in an upward direction. The flange 38 provided on the stem or handle 37 has been omitted. Ribs or webs 69 are provided for securing the stem or handle 37 within the wall 66. The configuration of the funnel-like portion 52, the filter member 47 and the filter retaining member 48 is such that they conform generally to the shape of the slots 12. In other words, they are elongate with arcuate ends.

The filter cup construction which is shown in FIGS. 6, 7 and 8 is utilized in a manner similar to the one described in FIGS. 1-5, the filter member 47 is placed on the bottom of the filter retaining member 18 so that the hole 43 receives the lower extremity of the stem or handle 67. The filter member 47 engages the lower extremities of the ribs 69 and the wall 66. The filter retaining member 48 with the filter member 47 mounted thereon is then inserted into the upper extremity of the funnel-like portion 52. As this occurs, the outer extremities of the filter member 48 will be bent upwardly and frictionally clamped between the walls 63 and 66 as shown in FIG. 7 so that a relatively tight seal is formed between the same whereby fluids introduced into the upper extremity of the funnel-like member must pass through the filter before they can drain into the cup-like receptacle 58.

The filter cup construction of the type shown in FIGS. 7 and 8 can then be inserted in each of the holes or slots 12 provided in the filter wheel 13. The filter cups can then be utilized in the same manner as hereinbefore described for the previous embodiment. They are also of a type which can be readily cleaned and, if necessary, can be considered to be of the disposable type.

It is apparent from the foregoing that there has been provided a new and improved filter cup construction which makes it possible to conduct a filtering operation at the same time that samples are being collected. The construction is such that the filter can be readily inserted and removed while still retaining a very good seal to ensure that all liquids introduced into the filter cup will be filtered.

I claim:

1. In a filter cup construction for use with a filter member having an opening therein, a cup-like member, said cup-like member having a stem-like cup portion and a funnel-like portion, said stem-like cup portion having a cup-like cavity therein open at the top, said funnel-like portion being formed integral with the stem-like portion and having a bottom wall having an opening therein in registration with the cup-like cavity, said bottom wall being inclined downwardly toward the opening, said funnel-like portion also having an upwardly extending wall, said funnel-like member being adapted to receive the filter member, and a filter retaining member disposed within said funnel-like portion, said filter retaining member including an upwardly extending wall inclined at an angle which is substantially identical to that of the angle of the upwardly extending wall of the funnel-like member, a hollow stem and means for securing said stem within said upwardly extending wall of the filter retaining member, said stem having a portion extending below the lower extremity of the upwardly extending wall of the filter retaining member, said filter retaining member being adapted to receive said filter member with its opening in registration with the lower extremity of the stem and having other portions thereof extending beyond the outer margins of the filter retaining member whereby when the filter retaining member is inserted into the funnel-like member, the outer extremities of the filter member are bent upwardly and clamped between the upwardly extending walls of the filter retaining member and the funnel-like portion whereby a fluid to be filtered can be poured onto the filter member between the stem of the filter retaining member and the funnel-like portion of the cup-like member and filtered fluid removed from the stem-like cup portion through the hollow stem.

2. A construction as in claim 1 wherein the filter member is spaced above the upper surface of the bottom wall of the funnel-like portion.

3. A construction as in claim 1 wherein said means for mounting said hollow stem whithin said upwardly extending wall of the filter retaining member includes radially extending ribs.

4. A construction as in claim 1 wherein said funnel-like portion and said filter retaining member have generally circular geometries.

5. A construction as in claim 1 wherein said funnel-like member and said filter retaining members have generally elongate configurations.

6. A construction as in claim 1 wherein said stem-like cup portions have conical cavities therein for collecting of liquids received into the cup-like cavity.

7. A construction as in claim 5 wherein said opening in said bottom wall is at one end of the bottom wall.

* * * * *